United States Patent Office 3,449,693
Patented June 10, 1969

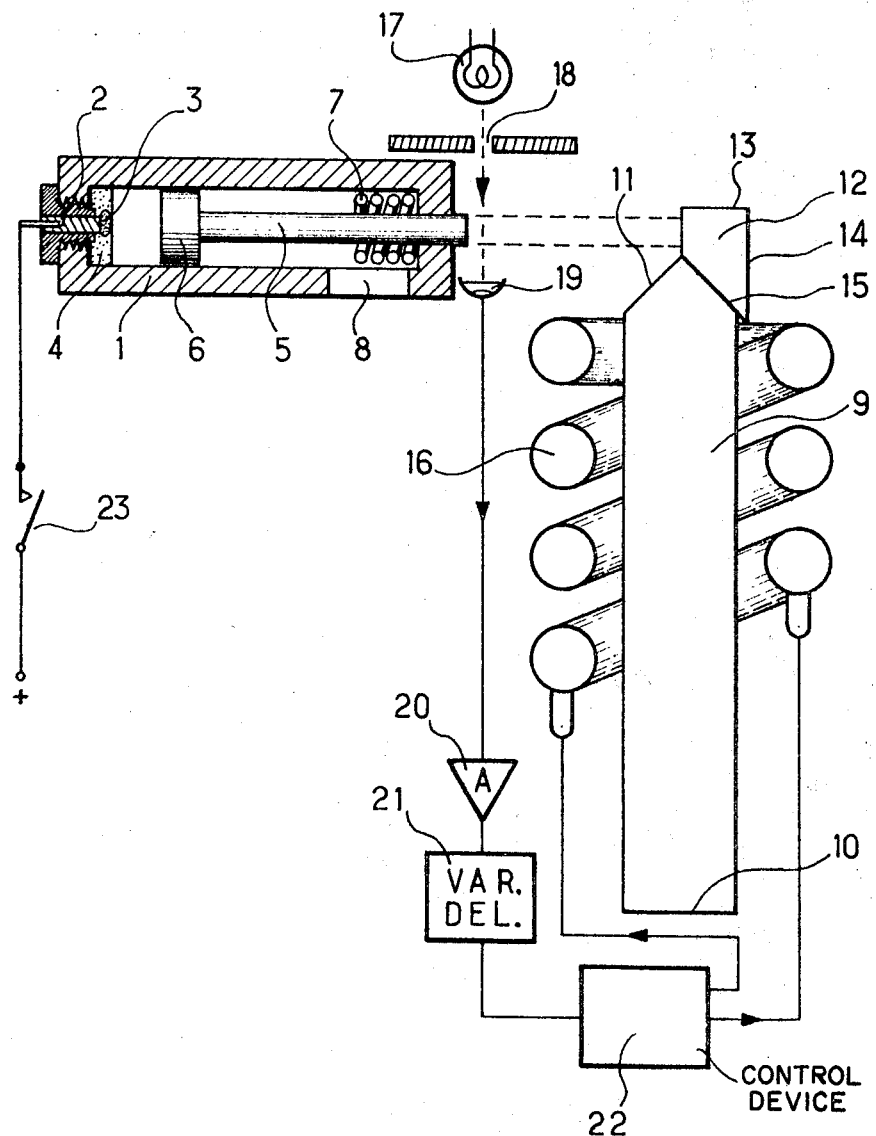

3,449,693
CONTROL DEVICE FOR LASER OSCILLATORS
Raymond Rocherolles, Sceaux, France, assignor to Compagnie Generale d'Electricite, Paris, France, a corporation of France
Filed July 10, 1964, Ser. No. 381,654
Claims priority, application France, July 10, 1963, 940,998
Int. Cl. H01s 3/02, 3/09, 3/16
U.S. Cl. 331—94.5      2 Claims

ABSTRACT OF THE DISCLOSURE

A device for triggering a crystal laser at a predetermined period after initiating optical pumping by displacement of a movable prism positioned adjacent one end face of the laser. An explosive actuated piston member is directed to impact the prism thereby removing the same from the end face of the laser upon detonation of the explosive. The extension rod passes through a light beam directed to a photocell for supplying an electrical impulse to a control device for illuminating a flash-lamp surrounding the laser just prior to removal of the prism from the end face of the laser by impact with the piston member.

---

The present invention has for its object a control device able to release short impulses of coherent light emitted by a laser oscillator, especially in the case of a ruby laser oscillator.

It is known that the atoms, ions or molecules existing in an element are in a stationary state which corresponds to a certain energetic level. When an atom is placed in a magnetic field, there is a certain probability for this atom to be transferred from the original state to a state corresponding to another energetic level.

The passing of this atom from a lower energetic level to a higher energetic level is accompanied by absorption of one photon and inversely when an atom comes back to the original state one photon is emitted. The photons, emitted during such a passing from a high level to a lower level, have the same phase and the same polarization as the inductive wave, i.e. the emitted photons are coherent with the electromagnetic wave which produces said passing from a level to another.

Thus, a ruby monocrystal in which the active medium is constituted by ions $C_r^{+++}$, having two parallel faces, submitted to the light of a rich spectrum lamp such as a xenon flash-lamp, is able to emit a flash of coherent light which length of wave is $\lambda = 6943$ A.

The ruby is used in laser oscillators because of the facility to realize, with the ions $C_r^{+++}$, the optic pumping which permits to full the level 2 which is characterized by its long duration of life. As a matter of fact the transition $1 \leftrightarrow 3$ is very wide, the very wide level 3 representing rather a band. The transition $3 \leftrightarrow 2$ is not accompanied by any radiation. On the other hand the transition $2 \leftrightarrow 1$ is very narrow and produces an emission of light using nearly all the energy represented by the gap between the levels 2 and 1. It is therefore possible to pump the atoms from the level 1 to the level 3 by means of a flash-lighting which has a strong intensity around the length of wave corresponding to the green colour. The atoms pass into the state 2 and are accumulated. When the condition of amplification, necessary to the laser effect, is fulfilled the emission is produced and this emission will be coherent if the crystal is correctly arranged to work as an echoing cavity like a Perot and Fabrey cavity, for example.

In order to realize a cavity working as a Fabrey and Perot interferometer, it has been used a ruby monocrystal having one of its parallel faces covered by a completely reflecting silver layer, the other face being only semireflecting. Thus it is possible to have a cavity working as an interferometer, and at the other hand, it is possible to obtain the radiation with an acceptable yeld. However, the silver layers disposed on the faces of the crystal present the disadvantage to be able to be damaged very quickly. It has been possible to obtain some improvement by using reflecting or semireflecting layers composed of several superposed dielectric layers, the different values of their refractive indexes being alternated. However, the layers so obtained are too fragile when it is question of devices working at very high energies. On the other hand, at the temperature of liquid nitrogen the plane partition surface air-ruby or ruby-air has a reflecting coefficient with a value of 8%. If one of the plane faces includes a reflector which reflecting coefficient is 100%, the second face can be left as it is, the combination of the coefficients 100% and 8% allowing the working of the laser effect with an acceptable yeld at said temperature. It is known to cut one of the faces of the crystal so as to obtain a right-angled prism, that in order to obtain a reflecting coefficient of 100% without the risk to damage one of the faces of said crystal. The device so realized allow to obviate the above mentioned disadvantages, the lack of any fragile layer suppressing any cause of damage.

However it is also known that the release of the laser effect, when said release is obtained by means of the crystal working as an interferometer, must take place at a very precisely defined time. It corresponds to the time when the number of the atoms, which are at the level 2, is maximum. This relatively wide maximum takes place about 700 microseconds after the start of the flash-lighting produced for example by a xenon flash-lamp. The release of the laser effect is often produced by electro-optical means as a Kerr cell for example or by means of an electrical field which acts on a crystal of the ADP or KDP types, or any other crystal presenting Pockels effect. Nevertheless, the passing of the light, emitted by the laser crystal, through such auxiliary devices, gives rise to secondary effects such as Raman effect in the nitrobenzene, or non-linear effects in the crystals presenting Pockels effect, all these effects presenting bad influence on the yeld of the control device.

The present invention allows to remedy these disadvantages. The present invention has for its object a control device for laser oscillators which includes a laser crystal with one of its faces out as a right-angled prism and a second face plane, said control device being characterised in that the crystal is arranged to be able to work when necessary as an interferometer, the work as an interferometer being controlled, at the right time for releasing the emission of light, by means of an auxiliary right angled prism which is displaced with a great speed, said auxiliary prism having two of its three active faces covered with an antireflecting layer, the third face being placed against the face of the crystal, which has been cut as a right-angled prism.

According to another feature of the invention, the quick displacement of said auxiliary prism is realized by means of a piston which is moved in a cylinder by a sudden expansion of a gas or by means of an explosive.

According to another feature of the invention the displacement of said auxiliary prism is realized by means of an hypersonic wave engendered in an appropriate tube.

According to another feature of the invention the energizing of the xenon flash-lamp is released by means of a photoeelectric device sensible to the displacement of said piston, the displacement of the auxiliary prism being set to take place at about 700 microseconds after the start of the flash-lighting.

The invention will be better understood with reference to the following specification and to the accompanying drawing which is given for solely illustrative and, in no way, limitative purpose.

In the figure the reference 1 shows a pistol including an electrical detonator 2 having a switch 23 connected to a suitable source of electrical energy. Upon closing the switch 23, the detonator 2 acts on the fulminate blasting-cap 3 which produces the explosion of the blasting 4 and the piston 5 is projected forward. The body 6 of the piston arrests its movement against the spring 7 and the gases of the explosion are evacuated through the aperture 8.

The ruby crystal 9 has a plane face 10 through which escapes the coherent beam of light emitted owing to the laser effect.

The face 11 is shaped as a right-angled prism, provided is a prism 12 which can be made of glass, of siliceous anhydrid ($SiO_2$) or any similar material, this prism having the faces 13 and 14 covered with an antireflecting layer, for example made of sellaite ($MgF_2$) when the prism is made of glass. The face 15 is held against one of the faces of the ruby crystal which is cut as a right-angled prism. Surrounding the ruby crystal 9 are spires 16 of an xenon flash-lamp.

An incandescent lamp 17 is placed behind a screen comprising a split 18 through which said lamp sends a beam of light to the photocell 19. Stopping the beam of light, caused by the passing of the piston 5 in front of the photocell, produces an electrical impulse which is sent to the input of the amplifier 20. After having been amplified, this impulse energizes the control device 22 causing the illumination of the flash-lamp 16. An adjustable delay line 21 placed between the amplifier 20 and the device 22 helps to delay the impulsion; this delay must be such as to allow the piston 5 to strike the prism made of glass 12 about 700 microseconds after the lighting of the xenon flash-lamp.

The speed of the bullets of pistols is generally between 280 and 300 meters per second. Admitting that the piston moves with a speed between 60 and 100 meters per second, that the speed of the separation of the prism is between 30 and 50 meters per second (it is supposed that the mass of the prism is nearly the same as the mass of the piston), the prism moves away from the crystal with a speed of 1 micron in 30 nanoseconds. Thus it is possible to obtain the satisfactory condition of moving away the prism for laser impulses having steep rising flanks. Supposing that the piston moves along a distance in the order of 5 to 10 cm., the duration of the movement will be about 1.5 ms. It will be therefore easy to cut in this gap of time a period of 700 microsecond separating the moment of the lighting of the xenon flash-lamp from the moment of the strike of the piston against the prism of glass.

It is understood that it is possible to bring various embodiments and modification to the mode of realisation given herein above for only illustrative purpose.

I claim:

1. In a control device for triggering a laser crystal of the solid rod type, an auxiliary prism having an antireflecting coating positioned on an end face of said laser crystal, means for projecting a piston member to impact and remove said prism from said end face of said laser crystal, a flash-lamp surrounding said laser crystal and connected to an impulse amplifier, a light beam source directing said beam in the path of said piston member, a photocell in said light beam path connected to said impulse amplifier, and means for actuating said projection means whereby said piston member moves towards said auxiliary crystal and interupts said light beam path for activating said impulse amplifier and lighting said flash-lamp a predetermined period after said piston member has interrupted said light beam path and before said piston member removes said prism from said laser crystal.

2. In a device according to claim 1, wherein an adjustable delay means is connected to the output of said impulse amplifier for adjusting the lapse of time between the time when said light beam path is interrupted by said piston member and the time when said flash-lamp is energized.

References Cited

Tools, Electronics, vol. 36, No. 13, pp. 16–17 (March 1963).

A Total Reflection Solid-State Resonator, Proc. IRE, vol. 50, No. 8 (August 1962).

Piper: Design Specif. for Opt. Ruby Rods, Microtechnic, vol. XVII, No. 2 (August 1963).

JEWELL H. PEDERSEN, *Primary Examiner.*

E. BAUER, *Assistant Examiner.*